Aug. 3, 1926.                           1,594,655
F. E. BESSLER
STAIRWAY
Filed July 11, 1923          4 Sheets-Sheet 1

Inventor
F. E. Bessler
By C. A. Snow & Co.
Attorneys.

Aug. 3, 1926.

F. E. BESSLER 1,594,655

STAIRWAY

Filed July 11, 1923

4 Sheets-Sheet 2

Inventor
F. E. Bessler
By C. A. Snow & Co.
Attorneys

Aug. 3, 1926. 1,594,655
F. E. BESSLER
STAIRWAY
Filed July 11, 1923  4 Sheets-Sheet 3
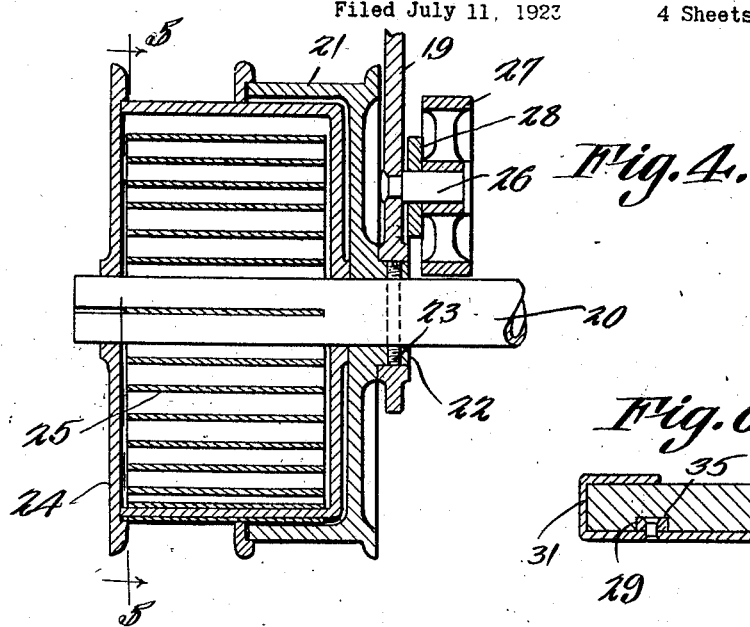
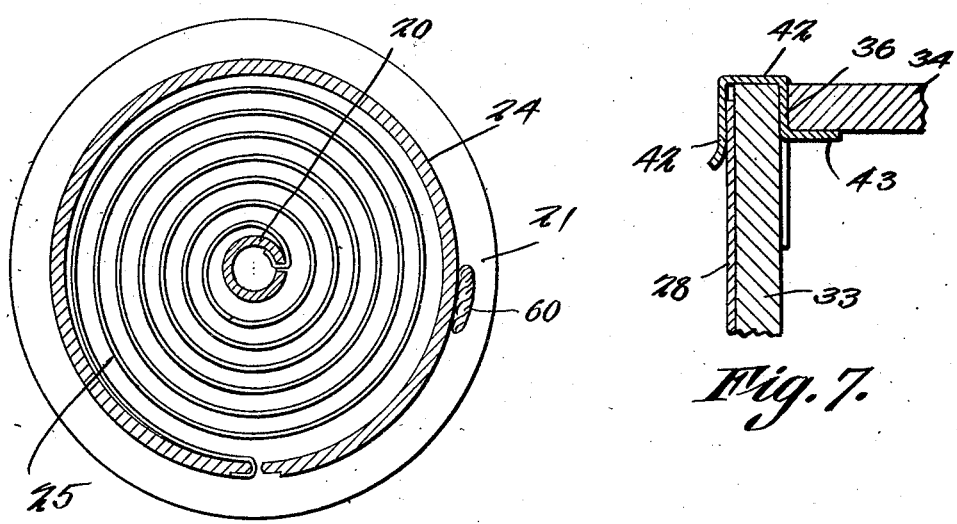
Fig. 4.
Fig. 6.
Fig. 5.
Fig. 7.
Inventor
F. E. Bessler
By C. A. Snow & Co.
Attorneys.

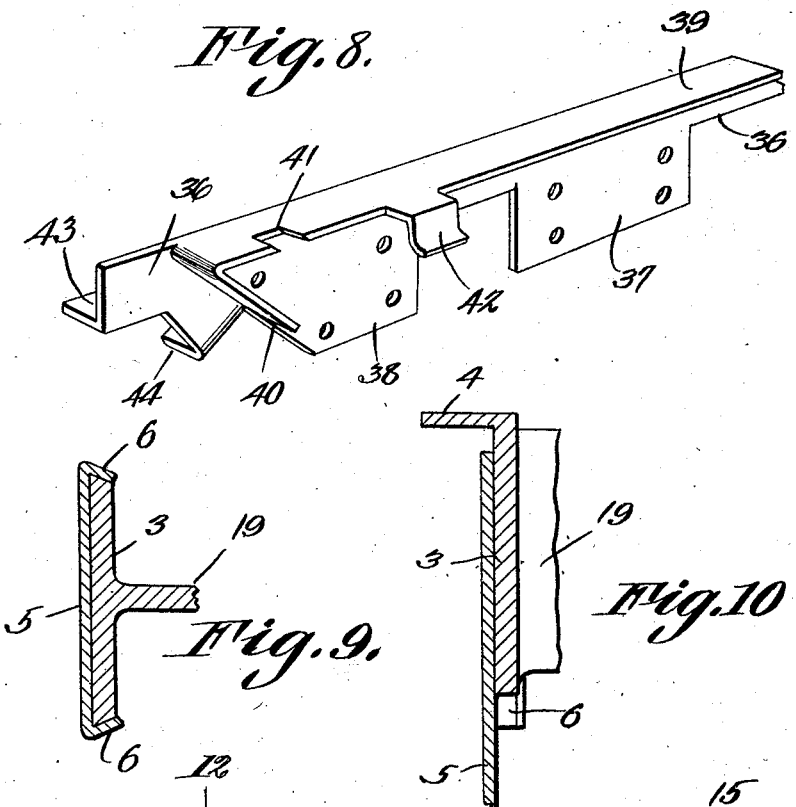
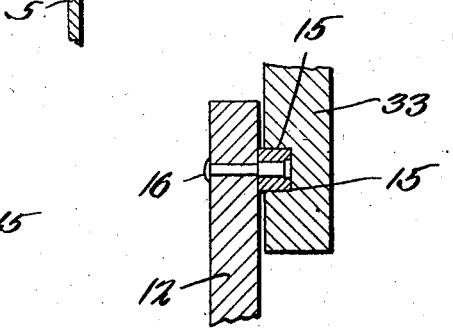

Patented Aug. 3, 1926.

1,594,655

UNITED STATES PATENT OFFICE.

FRANK E. BESSLER, OF AKRON, OHIO.

STAIRWAY.

Application filed July 11, 1923. Serial No. 650,939.

The device forming the subject matter of this application is of that general construction in which a stairway is mounted to slide on a panel hinged for vertical swinging movement, and the invention aims to provide novel means for mounting and operating the stairway and the panel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1:
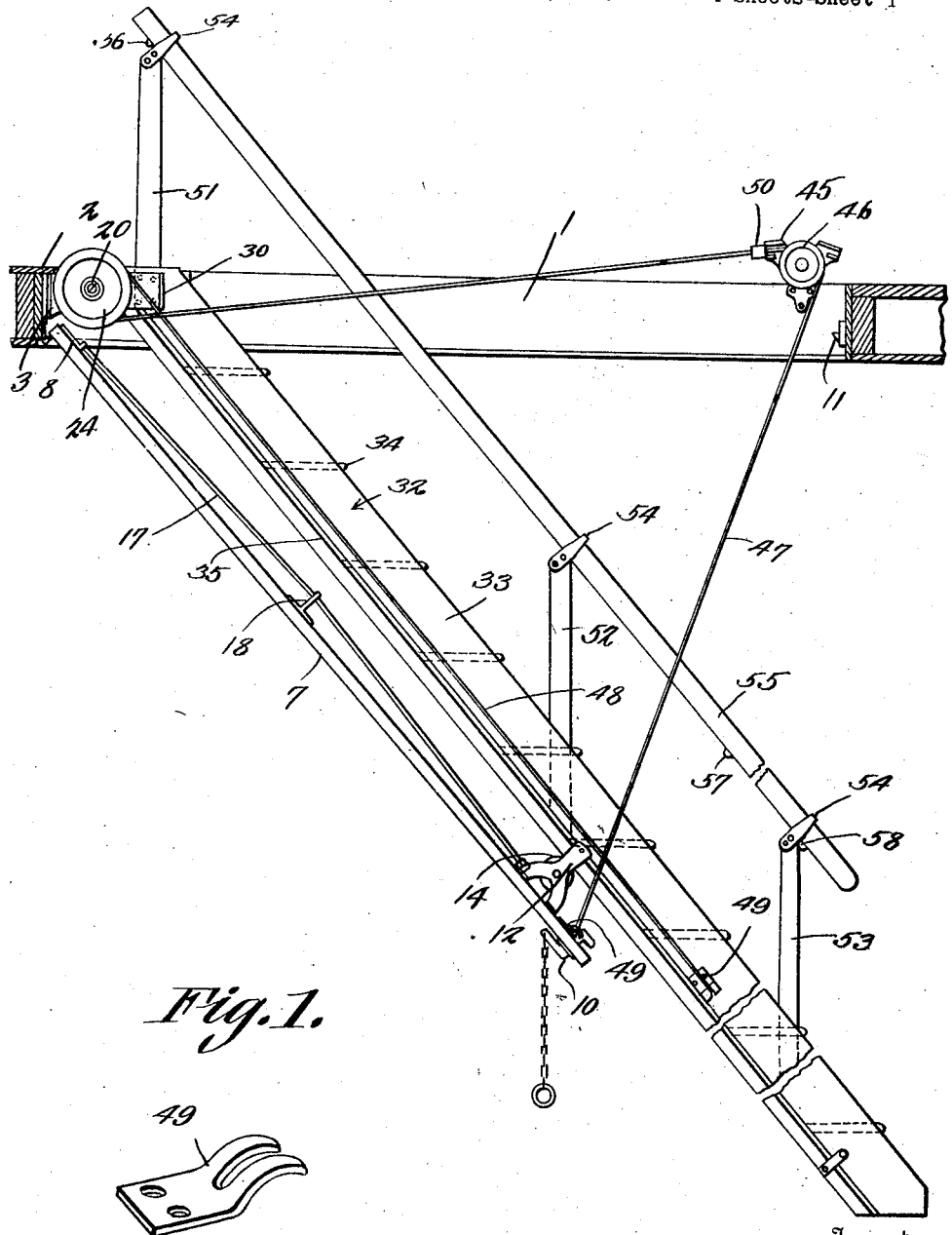
Figure 13:
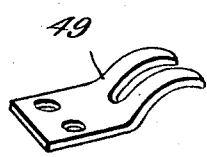
Figure 2:
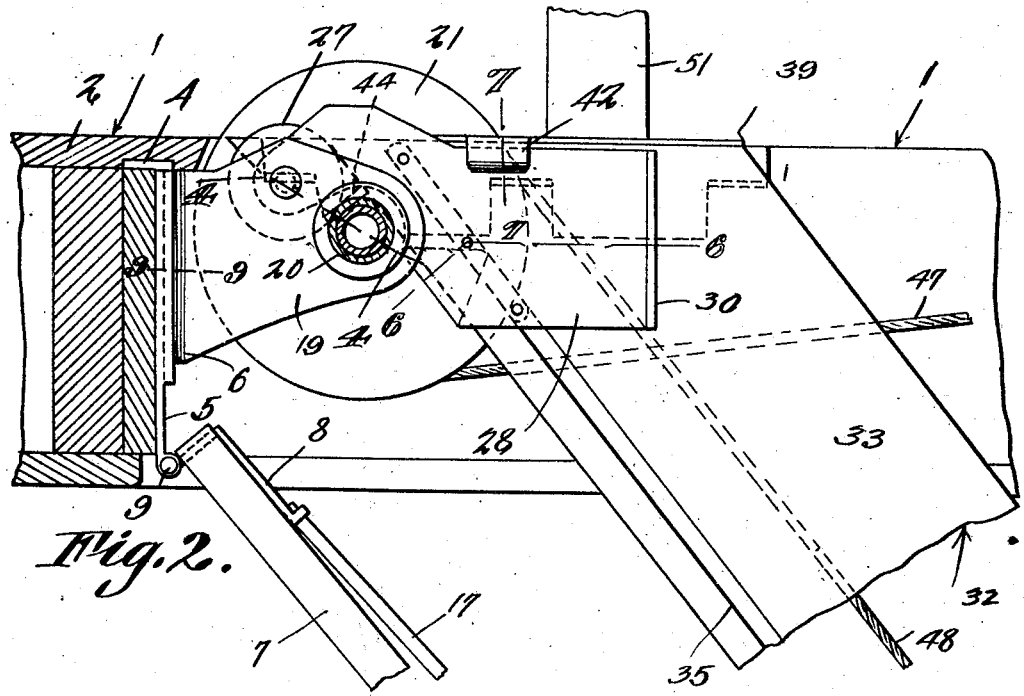
Figure 3:
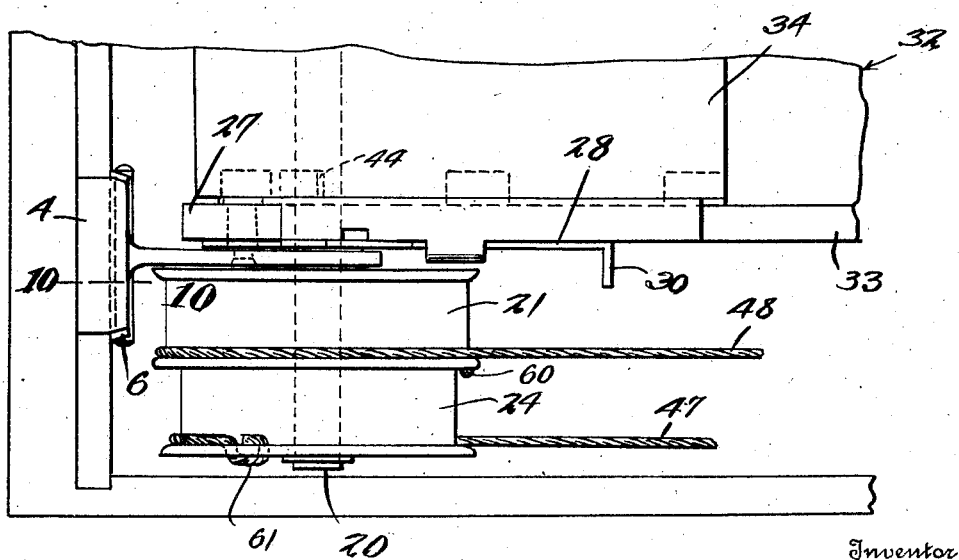

In the accompanying drawings:

Figure 1 shows in side elevation, a device constructed in accordance with the invention, the panel being swung downwardly and the stairway being lowered; Figure 2 is a sectional detail showing the uper end of the panel and the stairway and adjacent parts; Figure 3 is a plan of the structure depicted in Figure 2; Figure 4 is a section taken approximately on the line 4—4 of Figure 2; Figure 5 is a section on the line 5—5 of Figure 4; Figure 6 is a section on the line 6—6 of Figure 2; Figure 7 is a section on the line 7—7 of Figure 2; Figure 8 is a perspective showing the attaching plate; Figure 9 is a section on the line 9—9 of Figure 2; Figure 10 is a section on the line 10—10 of Figure 3; Figure 11 is an elevation disclosing a portion of the stairway and attendant parts; Figure 12 is a section on the line 12—12 of Figure 11; Figure 13 is a perspective view showing one of the cleats that hold the cables.

The numeral 1 marks a frame or support which may be the ceiling of a room, the floor being designated by the numeral 2. Vertical brackets 3 are provided, but one of the brackets being shown in the drawings. The bracket 3 is spaced from one end of the frame 1 and is provided at its upper end (Figure 10) with a horizontal flange 4 located below the floor 2 and engaging the upper edge of the frame 1. A hanger 5 is adjustably held between the bracket 3 and the end of the frame 1 and has side guides 6, cooperating with the vertical edges of the bracket 3 to hold the hanger on the bracket for vertical adjustment. The numeral 7 designates a vertically swinging panel having a hinge plate 8 which is pivoted at 9 to the lower end of the hanger 5. A latch 10 is mounted on the lower end of the panel 7 and is adapted to cooperate with a keeper 11 on the frame 1. Standards 12 are mounted on the panel 7 near to the lower end thereof and carry rollers 14. The standard carries a guide strip 15 on its inner surface, the guide strip being attached to the standard as shown at 16. A truss rod 17 extends between the hinge plate 8 and the standard 12 and is supported intermediate its ends, by a strut 18 on the panel 7. Each bracket 3 has an outstanding arm 19. In the arms 19, a shaft 20 is journaled. An outer drum 21 is supplied and has a hub 22 held on the shaft 20 by securing elements 23. The securing elements 23 are located in the opening of the arm 19 which receives the hub 22, and the arm 19, therefore, retains the securing elements against accidental displacement. An inner drum 24 extends within the outer drum 21 and is journaled on the shaft 20. A helical spring 25 is located in the drum 24, one end of the spring being connected to the drum 24 and the other end of the spring being connected to the shaft 20. Each arm 19 carries an inwardly projecting stub shaft 26. A roller 27 is journaled on the stub shaft 26. Guide plates 28 are mounted for swinging movement on the stub shafts 26 between the rollers 27 and the arms 19. Inwardly extended projections 29 are mounted on the inner surfaces of the guide plates 28. At their forward ends, the guide plates 28 have outstanding flanges 30. At their rear ends, the guide plates 28 are provided with hook-shaped flanges 31.

The numeral 32 marks a stairway slidable on the panel 7 longitudinally of the panel. The stairway 32 comprises stiles 33 and treads 34. The stiles 33 are mounted to ride on the rollers 27 and 14. The stiles 33 are supplied in their outer surfaces with guide grooves 35 receiving the strips 15 on the standards 12 and the projections 29 on the guide plates 28. The stiles 33 reciprocate in the hook-shaped flanges 31 of the plates 28. Supporting plates 36 are provided and have flanges 37 and 38 which are secured to the inner surfaces of the stiles 33 at the upper end thereof. Each plate 36 has an upper flange 39 engaging the upper end of each stile, the flange 39 having a downwardly extended lip 40 defining an angle wherein the beveled end of the stile is received. Each plate 39 has a notch 41 alined with the guide groove 35 in the stile 33. The flange 39 of each plate 36 has a depending angular arm 42. The plate 36 has inwardly projecting flanges 43 which support the uppermost tread 34 of the stairway 32. Adjacent to its inner end, the plate 36 has an angular stop 44.

A bracket 45 is mounted on the frame 1 and carries a pulley 46. A flexible element 47 extends over the pulley 46. One end of the flexible element 47 is connected by a cleat 49 to the lower end of the panel 7. The other end of the flexible element 47 is wound about the drum 24 and is connected thereto, as shown at 61. One end of a flexible element 48 is connected at 60 to the inner drum 21. The other end of the flexible element 48 is anchored by a cleat 49 to the stairway 32. The flexible element 47 carries a stop 50 adapted to cooperate with the bracket 45. A post 51 is fixedly mounted on the upper end of the device. The post 51 is connected to one of the plates 28 and is reinforced by the flange 30. The post 51 does not appear in Figure 6, because the post is on the opposite side of the device. Posts 52 and 53 are carried by the stairway 32. The posts 51, 52 and 53 are equipped at their upper ends with guides 54. A hand rail 55 is mounted for longitudinal reciprocation in the guides 54. A projection 56 on the hand rail 55, cooperating with the guide 54 of the post 51, limits the downward movement of the hand rail. A projection 58 on the hand rail 55 cooperating with the guide 54 of the post 53 limits the upward movement of the hand rail. The hand rail 55 carries a projection 57 located between the posts 52 and 53.

In practical operation, the panel 7 is swung downwardly on its pivotal mounting 9, the guide plates 28 swinging downwardly on the stub shafts 26 until the lower edges of the guide plates cooperate with the shaft 20. The stairway 32 is drawn downwardly on the panel 7 until the stops 44 engage the shaft 20, and until the arms 42 engage the upper edges of the guide plates 28. When the panel 7 is swung downwardly, the flexible element 47 rotates the drum 24 and puts the spring 25 under tension. When the stairway 32 slides downwardly on the panel 7, the flexible element 48 rotates the drum 21 and the shaft 20 puts the spring 25 under further tension. When the stairway 32 is slid upwardly, the spring 25 reacts on the flexible element 48 and aids in the upward movement of the stairway. In a like manner, the spring 25 reacts on the flexible element 47 and aids in the upward swinging movement of the panel. When the stairway 32 is slid upwardly, the guide 54 on the post 52, cooperating with the projection 57 on the hand rail 55, carries the hand rail upwardly, the hand rail sliding in the guides 54 of the posts 52 and 51.

What is claimed is:

1. In a device of the class described, a frame, a shaft supported for rotation on the frame, a first drum fixed to the shaft, a second drum rotatable on the shaft and partly enclosed by the first drum, a torsion spring connected to the second drum and to the shaft, a stub shaft supported on the frame, a roller on the stub shaft, a guide plate mounted to swing on the stub shaft, a panel hinged to the frame, a stairway slidable on the panel and on the roller, the stairway being slidable on the guide plate, a first flexible element connected at its ends to the first drum and to the stairway, a second flexible element connected at its ends to the second drum and to the panel, and means on the frame for guiding the intermediate portion of the second flexible element.

2. In a device of the class described, a frame, a panel hingedly connected to the frame, a stairway, means on the panel for supporting the stairway slidably, a guide plate, means for mounting the stairway slidably on the guide plate, an arm carried by the frame, means for pivoting the guide plate to the arm, a shaft mounted to rotate in the arm, the guide plate cooperating with the shaft to limit the downward swinging movement of the guide plate, first and second drums, the first drum being fixed to the shaft, and the second drum being mounted to turn on the shaft, a first flexible element connected at its ends to the stairway and to the first drum, a second flexible element connected at its ends to the panel and to the second drum, means on the frame for guiding the intermediate portion of the second flexible element, and a torsion spring connected to the shaft and to the second drum.

3. In a device of the class described, a frame, a panel, means for connecting the panel hingedly to the frame, a stairway, means for mounting the stairway slidably on the panel, a guide plate mounted to swing on the frame, means for mounting the stairway slidably on the guide plate, first and second drums, and a torsion spring connected to the second drum, a shaft journaled on the frame, the torsion spring being connected with the shaft, the second drum being mounted to turn on the shaft, and the first drum being fixed to the shaft, a first flexible element connected at its ends to the stairway and to the first drum, a second flexible element connected at its ends to the panel and to the second drum, a plate including an arm so located as to overlap the guide plate when the stairway is lowered, the arm-carrying plate being attached to one of the stiles of the stairway, and being supplied with means for carrying one of the treads of the stairway, and means on the frame for guiding the intermediate portion of the second flexible element.

In testimony that I claim the foregoing as my own, I have hereunto affixed my signature.

FRANK E. BESSLER.